United States Patent Office 3,492,319
Patented Jan. 27, 1970

3,492,319
QUATERNARY ANTHRAQUINONE DYESTUFFS
Melvin M. Turetzky, Poughkeepsie, N.Y., assignor to GAF Corporation, New York, N.Y., a corporation of Delaware
No Drawing. Continuation-in-part of application Ser. No. 287,770, June 14, 1963. This application June 21, 1966, Ser. No. 559,122
Int. Cl. C09b 1/40
U.S. Cl. 260—377
1 Claim

ABSTRACT OF THE DISCLOSURE

A dyestuff of the formula:

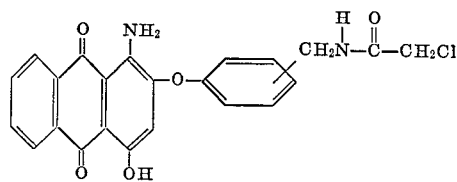

This application is a continuation-in-part of our earlier filed application Ser. No. 287,770, filed June 14, 1963, now U.S. Patent 3,274,198.

This invention relates to certain anthraquinone dyestuffs and to a method of preparing the same and relates more particularly to the preparation of novel anthraquinone compounds having an acylaminomethylene grouping combined with the fundamental framework of the anthraquinone.

With the development of new synthetic resins, it is necessary to provide dyestuffs which are compatible with, and have an affinity for, fibers and fabrics made from these resins. It has been found that many of the conventional cotton and wool dyestuffs are not useful for dyeing some of the synthetic fibers which are currently becoming widely accepted for the manufacture of clothing and other similar articles. It has been found that particularly difficult materials to dye are those having a basis of a polyacrylonitrile or a modified polyacrylonitrile resin such as the fibers sold under the trademarks Acrilan, Orlon, Verel and Dyrel. Many of the previously developed dyestuffs suffer from poor light and wash fastness as well as having a poor affinity for fibers having a polyacrylonitrile base.

An important object of this invention is to provide novel anthraquinone dyestuff intermediates which can dye or form dyestuffs which dye synthetic fibers, particularly those having a basis of polyacrylonitrile or a modified polyacrylonitrile resin, in bright full shades of excellent light and wash fastness.

Another object of the instant invention is the provision of a novel process for preparing the dyestuff intermediates and dyes of the instant invention.

Other objects and advantages of this invention will appear from the following detailed description and the claim appended hereto.

The dyestuffs of the instant invention are prepared from anthraquinone derivatives having the following general structure

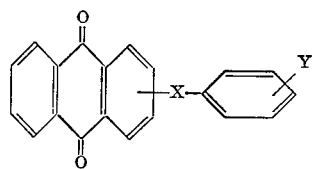

where X represents oxygen, a secondary amine or sulfur and Y represents hydrogen or an electron-donating substituent, such as a methyl, methoxy or methylthio radical. The presence of other substituents in either anthraquinone ring appears to have no effect on the course of the reaction. This can be seen from the following representative list of anthraquinone derivatives which can undergo this reaction:

1-amino-4-anilino anthraquinone
1-amino-4-toluidino anthraquinone
1-methylamino-4-p-toluidino anthraquinone
4-aminoanthraquinone-1,2-acridone
4-p-toluidino-1,9-anthrapyridone
1-amino-2-phenoxy-4-hydroxyanthraquinone
1-amino-4-p-anisidino anthraquinone
1-amino-2-methyl-4-p-toluidino anthraquinone
1-hydroxy-4-p-anisidino anthraquinone
1-hydroxy-4-p-thioanisidino anthraquinone
1,4-bis-p-toluidino anthraquinone
1-amino-2-carboxy-4-p-toluidino anthraquinone
1,8-dihydroxy-4-p-toluidino-4-aminoanthraquinone
1-p-toluidino-4,5,8-trihydroxy anthraquinone
1-amino-4-phenoxy anthraquinone
1-methylamino-3-phenoxy anthraquinone
1-hydroxy-2-p-toluidino anthraquinone
3-p-toluidino anthraquinone
1-methyl-2-mercaptophenyl anthraquinone
1-amino-3-mercaptophenyl anthraquinone
4-mercaptophenyl anthraquinone
1-methylamino-4-p-methyl mercaptophenyl anthraquinone The above list is not intended to be exclusive or limiting, but only to indicate the scope of the anthraquinone derivatives that may be used as starting materials in the preparation of the dyestuff intermediates and the dyestuffs of the instant invention.

The dyestuff intermediates of this invention are anthraquinone, methylene-chloroamide compounds of the structure:

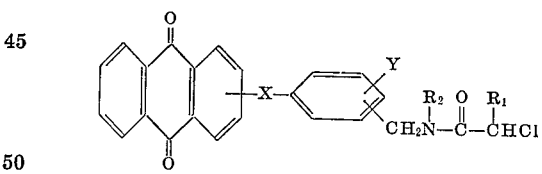

wherein X represents oxygen, a secondary amine or sulfur and wherein Y represents hydrogen or an electron-donating substituent such as, for example, a methyl, methoxy or methylthio radical and wherein $R_1$ and $R_2$ may be either hydrogen atoms or alkyl radicals. Such intermediates are prepared by reacting a compound having the structural formula set forth hereinabove as a starting material with paraformaldehyde and an alphahaloamide, such as chloroacetamide at a temperature below about 100 C. The preferred solvent for these reactions is a strong dehydrating medium such as, for example, concentrated sulfuric or polyphosphoric acid. The new anthraquinone derivatives thereby obtained are insoluble in water, and if the reaction mixture is diluted with large volumes of water, the dyestuff intermediates of the instant invention will precipitate out and be readily isolated by filtration. These materials are useful as pigment dyestuffs themselves, or may be converted by the process set forth in our copending application Ser. No. 287,770 to the water-soluble quaternary dyestuffs which are excellent for dyeing fibers formed from polyacrylonitrile or modified polyacrylonitrile resins.

In general, equimolar amounts of reactants are employed so as to produce substantially single substitution of the chloroamide radical on the anthraquinone nucleus. However, moderate excesses of any of the reactants have not been found to adversely affect the resultant product in both its employment as a pigment dyestuff itself or as an intermediate in producing effective water-soluble quaternary dyes.

In addition to chloroacetamide, suitable alphahaloamides include, for example, N-methyl chloroacetamide, N-propyl chloroacetamide, N-isobutylchloroacetamide, methyl chloroacetamide, ethyl chloroacetamide, N-butyl chloroacetamide, N-methyl, propyl chloroacetamide, N-isobutyl methyl chloroacetamide, etc.

The method of synthesis of these dyestuff intermediates will become more apparent from the following illustrative examples in which parts are by weight.

EXAMPLE I

The dyestuff intermediate of the formula:

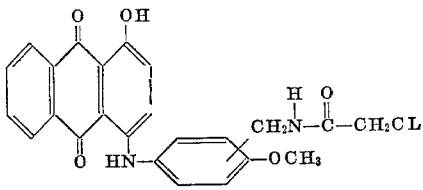

was prepared as follows:

To 200 cc. of 100% sulfuric acid were added 20 grams of alpha-chloroacetamide, 11 grams of paraformaldehyde and 9 grams of phosphorus pentoxide. To this mixture, 10 grams of 1-hydroxy-4-p-anisidino anthraquinone were added, and the reaction mixture was heated to 85° to 90° C. The heated mixture was then drowned into ice water, filtered, washed neutral, and dried in a vacuum oven at a temperature of 45° to 50° C. The yield was 13.4 grams of a blue solid. The chlorine analysis of this material indicated that the starting material, i.e., the 1-hydroxy-4-p-anisidino anthraquinone, was somewhat less than monosubstituted.

EXAMPLE II

The dyestuff intermediate of the formula:

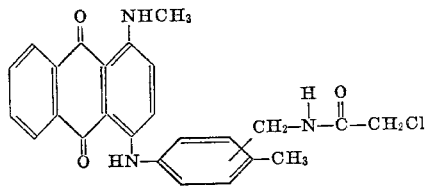

was prepared as follows:

Forty cc. of sulfuric acid-monohydrate, 4.0 grams of alpha-chloroacetamide, 2.2 grams of paraformaldehyde and 1.8 grams of phosphorus pentoxide were charged into a 100 cc. flask. Two grams of 1-methylamino-4-p-toluidino anthraquinone were added to the flask, and the mixture was heated to 85° C. After two hours the reaction mixture was cooled in the manner of Example I, and the dyestuff intermediate was isolated by filtration. Upon drying, 2.4 grams of a product were recovered which had chlorine analysis of 7.0% $C_{25}H_{22}O_3N_3Cl$, i.e., a monosubstituted material, requires 7.9% chlorine. It can therefore be seen that this product was somewhat less than monosubstituted.

EXAMPLE III

The dyestuff intermediate of the formula:

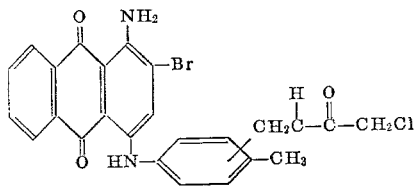

was prepared as follows:

The reaction described in Example II was repeated, but in lieu of the 1-methylamino-4-p-toluidino anthraquinone, 1-amino-a-bromo-4-p-toluidino anthraquinone was used. A product of 2.9 grams of the above intermediate chloroamide wase isolated.

EXAMPLE IV

The dyestuff intermediate of the formula:

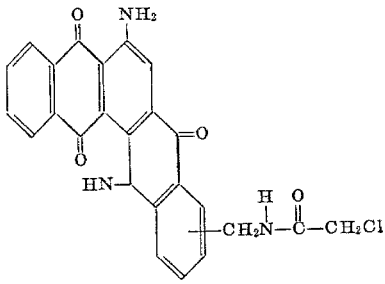

was prepared as follows:

The process of Example II was repeated, using 4-amino-1,2-anthraquinoneacridone in lieu of the 1-methylamino-4-p-toluidino anthraquinone.

EXAMPLE V

The dyestuff intermediate of the formula:

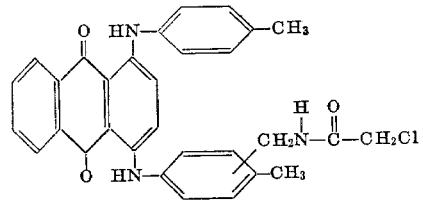

was prepared as follows:

The process of Example II was repeated, using 1,4-bis-(p-toluidino)anthraquinone as a starting material.

EXAMPLE VI

The dyestuff intermediate of the formula:

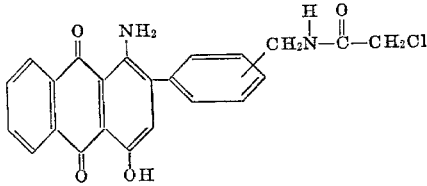

was prepared as follows:

To the monohydrate, alpha-chloroacetamide, paraformaldehyde and phosphorus pentoxide of Example II were added 2.0 grams of 1-amino-2-phenoxy-4-hydroxyanthraquinone. After isolating and drying the reaction product, it was analyzed for chlorine content and was found to contain 8.82% chlorine. The theoretical chlorine content of $C_{23}H_{17}O_5N_2Cl$, that is, a monosubstitued material, is 8.10%. This material is, therefore, slightly more than monosubstituted.

EXAMPLE VII

The dyestuff intermediate of the formula:

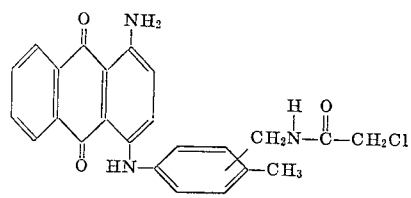

was prepared as follows:

Forty cc. of monohydrate, 4.0 grams of alpha-chloroacetamide, 2.2 grams of paraformaldehyde, and 1.8 grams of phosphorus pentoxide were charged into a 100 cc. flask. Two grams of 1-amino-4-p-toluidino anthraquinone were added to the flask and the reaction mixture was maintained at 30° C. to 35° C. for three hours. The reaction product was then isolated in the manner of Example I.

All of the above prepared materials were found to be useful as pigment dyestuffs by themselves. Furthermore, these materials were found to be extremely useful in the preparation of quaternary nitrogen anthraquinone dyestuffs, as shown in our copending application Ser. No. 287,770.

Although various embodiments of the present invention have been shown by way of specific example, it is to be understood that the invention is not to be limited thereto but should be construed as broadly as all or any equivalents thereof.

What is hereby claimed and desired to be secured by letters patent is:

1. The compound of the formula:

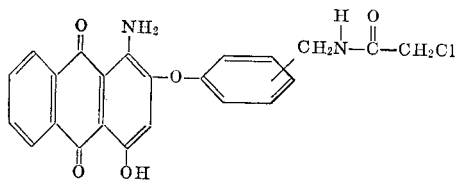

References Cited

FOREIGN PATENTS 1,222,194    1/1960    France.

OTHER REFERENCES

Lubs, Synthetic Dyes, pp. 417 and 418 (1955).

LORRAINE A. WEINBERGER, Primary Examiner

H. C. WAGNER, Assistant Examiner